United States Patent
Koyama

(10) Patent No.: US 9,726,884 B2
(45) Date of Patent: Aug. 8, 2017

(54) DISPLAYING APPARATUS UNIT AND PROJECTION TYPE DISPLAYING APPARATUS

(71) Applicant: CANON KABUSHIKI KAISHA, Tokyo (JP)

(72) Inventor: Takehiro Koyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 14/669,290

(22) Filed: Mar. 26, 2015

(65) Prior Publication Data

US 2015/0277112 A1 Oct. 1, 2015

(30) Foreign Application Priority Data

Mar. 31, 2014 (JP) .................................. 2014-073392

(51) Int. Cl.
*G02F 1/1335* (2006.01)
*G02B 27/00* (2006.01)
(Continued)

(52) U.S. Cl.
CPC ....... *G02B 27/0006* (2013.01); *G03B 21/006* (2013.01); *G03B 21/145* (2013.01);
(Continued)

(58) Field of Classification Search
CPC .... G02F 1/1335; G02B 21/145; H04N 9/3105
See application file for complete search history.

(56) References Cited

U.S. PATENT DOCUMENTS 7,868,963 B2  1/2011  Koyama et al.
2003/0231287 A1  12/2003  Maki et al.
(Continued)

FOREIGN PATENT DOCUMENTS

CN    1226974 A    8/1999
JP    11305674 A   11/1999
(Continued)

OTHER PUBLICATIONS

Office Action issued in JP2014-073392, mailed Feb. 16, 2016.
(Continued)

*Primary Examiner* — Timothy L Rude
(74) *Attorney, Agent, or Firm* — Rossi, Kimms & McDowell LLP

(57) ABSTRACT

The displaying apparatus unit according to the present invention includes a first holder configured to hold a displaying element, a second holder configured to hold an optical operating plate which operates on light from the displaying element, a first dustproof cover member disposed between the first holder and the second holder, and configured to cover a whole side surface of the displaying element, and a second dustproof cover member disposed between the first dustproof cover member and the second holder, wherein the first dustproof cover member is in contact with the first holder, the second dustproof cover member is in contact with the second holder, the first dustproof cover member and the second dustproof cover member are in contact with each other, and the first dustproof cover member has a hardness higher than that of the second dustproof cover member.

8 Claims, 8 Drawing Sheets

(51) Int. Cl.

| | | |
|---|---|---|
| *H04N 5/74* | (2006.01) | |
| *H04N 9/31* | (2006.01) | |
| *G03B 21/00* | (2006.01) | |
| *G03B 21/14* | (2006.01) | |

(52) U.S. Cl.
CPC ......... *H04N 5/7441* (2013.01); *H04N 9/3105* (2013.01); *H04N 9/3138* (2013.01); *H04N 9/3141* (2013.01); *H04N 9/3167* (2013.01)

(56) References Cited

U.S. PATENT DOCUMENTS

| | | | |
|---|---|---|---|
| 2009/0201468 A1 | 8/2009 | Tanaka | |
| 2011/0279489 A1 | 11/2011 | Tanaka | |
| 2013/0258215 A1* | 10/2013 | Kaneda | F21K 9/58 |
| | | | 349/5 |
| 2014/0218664 A1* | 8/2014 | Nimura | G02F 1/133526 |
| | | | 349/95 |
| 2014/0307005 A1* | 10/2014 | Kita | G02B 27/2235 |
| | | | 345/690 |

FOREIGN PATENT DOCUMENTS

| | | | |
|---|---|---|---|
| JP | 2003177382 A | 6/2003 | |
| JP | 2004219971 A | 8/2004 | |
| JP | 2007011301 A | 1/2007 | |
| JP | 2007108735 A | 4/2007 | |
| JP | 2011090192 A | 5/2011 | |

OTHER PUBLICATIONS

Office Action issued in Chinese Patent Application No. 201510143870.9 dated Jun. 13, 2017. English translation provided.

\* cited by examiner

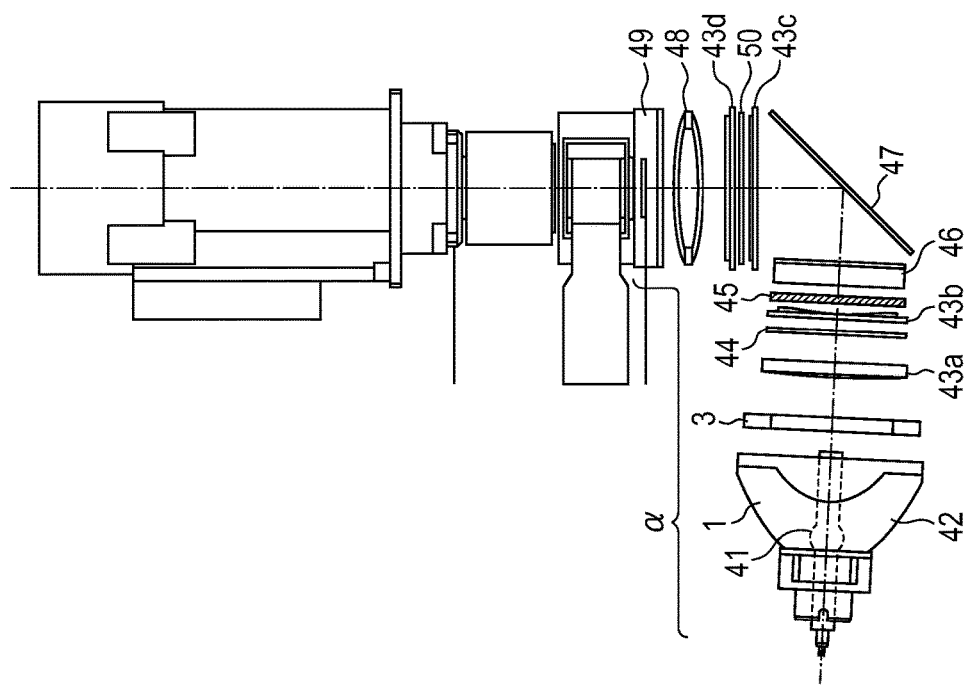
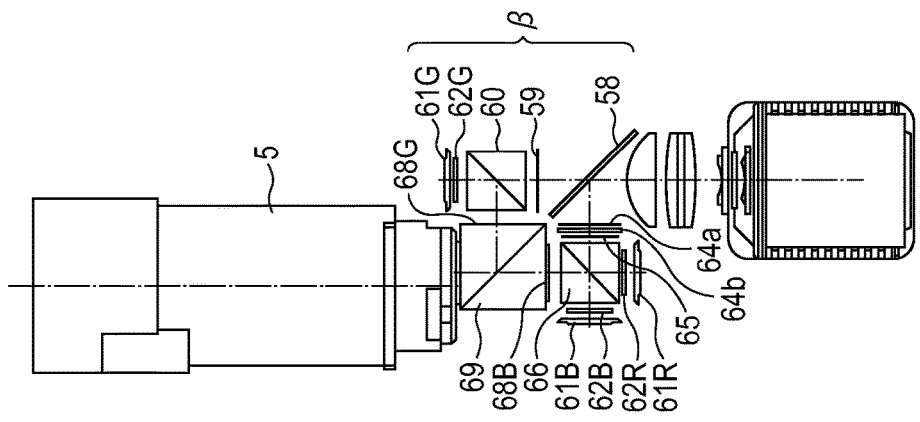

DISPLAYING APPARATUS UNIT AND PROJECTION TYPE DISPLAYING APPARATUS

BACKGROUND OF THE INVENTION

Field of the Invention

The present invention relates to a displaying apparatus unit and a projection type displaying apparatus, and is suitable for a liquid crystal projector using a reflection type liquid crystal panel.

Description of the Related Art

In the conventional reflection type liquid crystal panels, a dustproof structure is necessary for a displaying element peripheral portion. This is so because there is a problem that dust on a liquid crystal cover glass is displayed in a projected image. In U.S. Patent Application Publication No. 2003/0231287, dustproof structures are formed before and after a liquid crystal panel, so dust is inconspicuous even when it is projected onto a screen. That is, a dustproof structure is formed by arranging a light polarization plate in a position spaced apart from the liquid crystal panel to surround the space between the liquid crystal panel and the light polarization plate by a frame body.

As a displaying pixel of the liquid crystal panel is downsized and the panel size is decreased, the entrance of finer dust particles sometimes poses a problem. If dust particles having the same size adhere to a liquid crystal panel cover glass surface, wavelength plate surface, and prism surface, defocus amounts projected on a projection screen become different in accordance with the positions, so the influences on the projection screen are also different.

The size of a dust particle which poses a problem when adhering to a liquid crystal panel is about the size of a pixel. On the other hand, when a dust particle adheres to the surface of a wavelength plate arranged apart from the liquid crystal panel, the dust particle is defocused on a projection screen, so the size of a dust particle allowed to adhere to the wavelength plate is larger than that of a dust particle allowed to adhere to the liquid crystal panel cover glass surface. Accordingly, the size of a dust particle allowed to adhere to an optical component in a liquid crystal panel peripheral portion is proportional to the distance from the liquid crystal panel.

A liquid crystal panel generally shifts (deviates), falls, and rotates in the X and Y directions in order to adjust the position. Therefore, a dustproof cover member in contact with the liquid crystal panel has to absorb a stress generated by displacement caused by this posture difference. Conventionally, a relatively soft (low-hardness) dustproof structure is necessary to eliminate the influence of this stress on the liquid crystal panel. Also, a quarter wavelength plate is rotated relative to the liquid crystal panel around the optical axis in order to adjust the contrast, so a stress generated during the rotation has to be absorbed. That is, in the conventional arrangement, priority is given to accuracy by absorbing the posture difference as described above, so a soft material has to be used as the dustproof cover member.

SUMMARY OF THE INVENTION

To achieve the above-mentioned object, a displaying apparatus unit according to the present invention includes a first holder configured to hold a displaying element, a second holder configured to hold an optical operating plate which operates on light from the displaying element, a first dustproof cover member disposed between the first holder and the second holder, and configured to cover a whole side surface of the displaying element, and a second dustproof cover member disposed between the first dustproof cover member and the second holder, wherein the first dustproof cover member is in contact with the first holder, the second dustproof cover member is in contact with the second holder, the first and second dustproof cover members are in contact with each other, and the first dustproof cover member has a hardness higher than that of the second dustproof cover member.

Further features of the present invention will become apparent from the following description of exemplary embodiments with reference to the attached drawings.

BRIEF DESCRIPTION OF THE DRAWINGS

FIG. 2A is a front view showing an optical system related to the first embodiment.

FIG. 2B is a side view showing the optical system related to the first embodiment.

DESCRIPTION OF THE EMBODIMENTS

In the conventional dustproof structure in which the dustproof cover member has a low hardness as described above, a slight noncontact portion (gap) is sometimes formed on the dustproof contact surface due to, e.g., the accuracy of a part, and dust may enter from this gap. The pixel pitch of a liquid crystal panel is about a few µm. Therefore, if a dust particle larger than the pixel pitch enters from this gap and adheres on a liquid crystal panel cover glass, the dust particle is conspicuous on a screen because the defocus amount is insufficient.

As described above, a structure which prevents finer dust particles is necessary in the peripheral portion of the liquid crystal panel. This makes it important to select a material having a higher hardness in order to improve the adhesion of the contact portion. That is, it is necessary to overcome the conflicting relationship as described above in the dustproof cover member.

The present invention provides a displaying apparatus unit and projection type displaying apparatus having both a certain robustness required for dustproof and a certain flexibility which suppresses a stress to a displaying element.

Preferred embodiments of the present invention will be explained in detail below with reference to the accompanying drawings.

First Embodiment

Projection Type Displaying Apparatus

Figure 3:
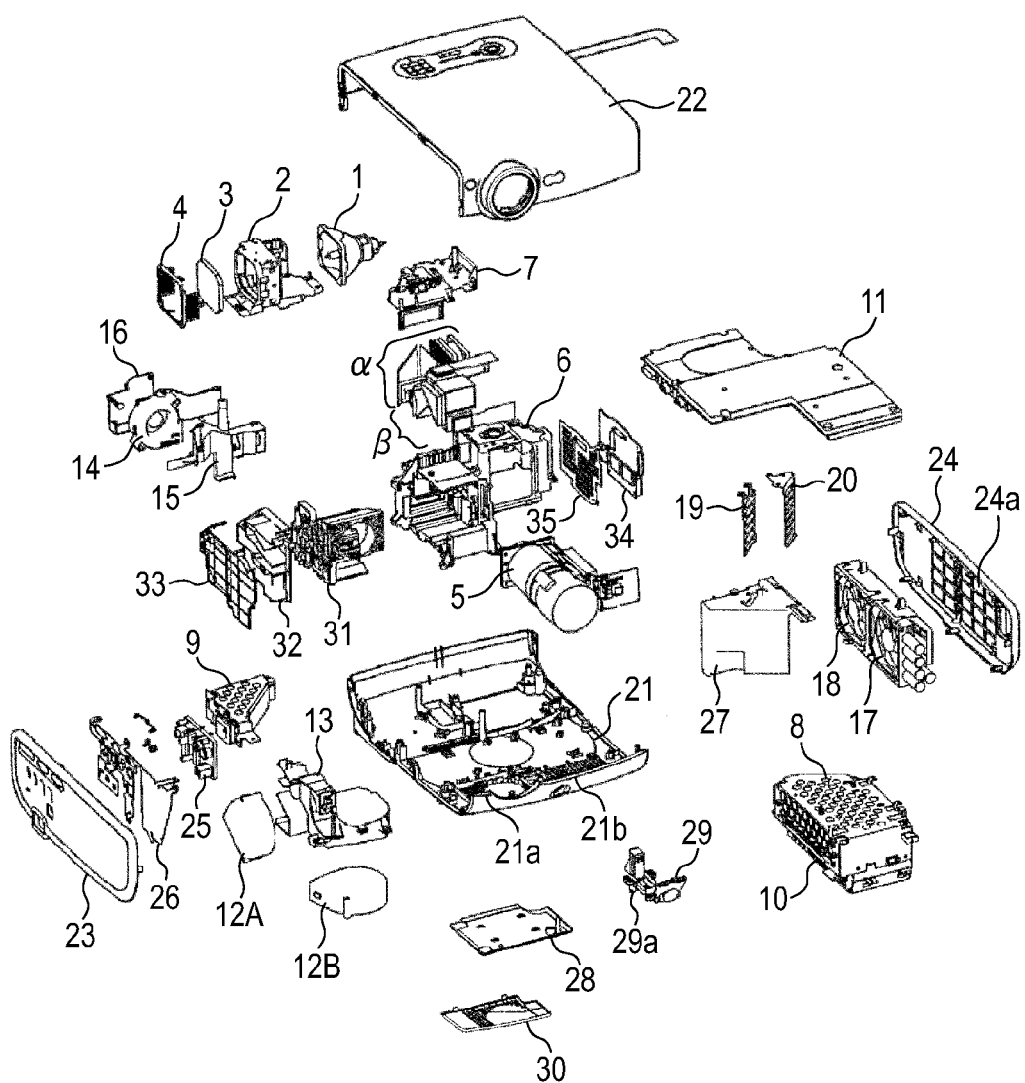
FIG. 3 is an exploded perspective view of a projection type displaying apparatus incorporating a displaying apparatus unit according to the first embodiment.

FIG. 3 is an exploded perspective view of a projection type displaying apparatus incorporating a displaying apparatus unit according to the first embodiment. Referring to FIG. 3, the apparatus includes a light source lamp 1, a lamp holder 2 for holding the lamp 1, an explosion-proof glass 3, and a glass retainer 4. An illumination optical system α receives light from the lamp 1. A color decomposing/synthesizing optical system β includes a liquid crystal panel for three colors RGB, and receives exit light from the illumination optical system.

A projection lens barrel 5 receives exit light from the color decomposing/synthesizing optical system, and projects the light onto a screen (projection target surface) (not shown). A projection lens optical system as a projection optical system (to be described later) is accommodated in the projection lens barrel 5. An optical box 6 accommodates the lamp 1, illumination optical system α, and color decomposing/synthesizing optical system β, and fixes the projection lens 5. In the optical box 6, a lamp case member 6a as a lamp peripheral member surrounding the lamp 1 is formed.

An optical box lid 7 covers the optical box 6 in a state in which the illumination optical system α and color decomposing/synthesizing optical system β are accommodated. The apparatus also includes a power supply 8, a power supply filter 9, and a ballast power supply 10 which is integrated with the power supply 8 and turns on the lamp 1. A circuit board 11 drives the liquid crystal panel by electric power from the power supply 8, and transmits a command for turning on the lamp 1.

Optical system cooling fan A 12A and cooling fan B 12B cool optical elements such as the liquid crystal panel in the color decomposing/synthesizing optical system β by inhaling air from an air intake 21a of an exterior cabinet 21. An RGB duct A 13 supplies the air from the optical cooling fans 12 to the optical elements such as the liquid crystal panel in the color decomposing/synthesizing optical system β.

A light source lamp cooling fan 14 cools the lamp 1 by supplying a blowing air to it. A lamp duct A 15 supplies the cooling air to the lamp while holding the lamp cooling fan 14. A lamp duct B 16 constructs a duct together with lamp duct A 15 by pressing the cooling fan 14. A power supply cooling fan 17 simultaneously cools the power supply 8 and ballast power supply 10 by circulating an air in the power supply 8 and the ballast 10 by inhaling air from an air intake 21b disposed in the exterior cabinet 21.

An exhaust fan 18 exhausts a hot air passing through the lamp 1 from the lamp cooling fan 14. A lamp exhaust louver A 19 and lamp exhaust louver B 20 have a light-shielding function which prevents the light from the lamp 1 from leaking outside the apparatus.

An exterior cabinet (exterior cabinet lower portion) 21 accommodates the optical box 6 and the like. An exterior cabinet lid (exterior cabinet upper portion) 22 covers the exterior cabinet 21 in which the optical box 6 and the like are accommodated. The apparatus also includes a side plate A 23 and side plate B 24. The above-described air intakes 21a and 21b are formed in the exterior cabinet 21, and an exhaust port 24a is formed in the side plate B 24.

An interface board 25 incorporates a connector for receiving various signals. An interface reinforcing plate 26 is attached to the inside of the side plate A 23. A lamp exhaust box 27 guides exhaust heat from the lamp 1 to the exhaust fan 18, thereby preventing the diffusion of the exhaust air inside the apparatus. The lamp exhaust box 27 holds the lamp exhaust louver A 19 and lamp exhaust louver B 20.

A lamp lid 28 is detachable from the bottom surface of the exterior cabinet 21, and fixed by screws (not shown). A set adjusting leg 29 is fixed to the exterior cabinet 21, and the height of a foot 29a is adjustable. The inclination angle of the apparatus body can be adjusted by adjusting the height of the foot 29a.

A RGB air intake plate 30 presses a filter (not shown) attached to the outside of the air intake 21a of the exterior cabinet 21. A prism base 31 holds the color decomposing/synthesizing optical system β. A box side cover 32 has a duct-shaped portion for guiding the cooling air from the cooling fan A 12A and cooling fan B 12B in order to cool the optical elements of the color decomposing/synthesizing optical system β and a reflection type liquid crystal displaying element as a reflection type displaying element. An RGB duct B 33 forms a duct together with the box side cover 32.

An RGB board 34 is arranged in the color decomposing/synthesizing optical system β. An FPC from the reflection type liquid crystal displaying element is connected to the RGB board 34, and the RGB board 34 is connected to the circuit board 11. An RGB board cover 35 prevents electrical noise from entering the RGB board 34.

(Optical Arrangement)

Next, the optical arrangement of the projection type image displaying apparatus incorporating the reflection type liquid crystal displaying element (an image formation element such as a reflection type liquid crystal panel) including the lamp 1, illumination optical system α, color decomposing/synthesizing optical system β, and projection lens 5 described above will be explained with reference to FIGS. 2A and 2B. Referring to FIGS. 2A and 2B, a light-emitting tube 41 emits white light by a continuous spectrum, and reflector 42 converges the light from the light-emitting tube 41 in a predetermined direction. The light-emitting tube 41 and reflector 42 form the lamp 1.

A first cylinder array 43a includes a lens array having a refractive power in the horizontal direction (a horizontal direction (a direction perpendicular to the drawing surface) in the propagation direction of the light from the lamp 1). A second cylinder array 43b includes lens arrays corresponding to the individual lenses of the first cylinder array 43a. The apparatus further includes an ultraviolet absorption filter 44, and a polarization conversion element 45 which converts unpolarized light into predetermined polarized light. A front compressor 46 includes a cylindrical lens having a refractive power in the vertical direction. A total reflection mirror 47 converts the optical axis through 88°.

A third cylinder array 43c includes a lens array having a refractive power in the vertical direction (a vertical direction (a direction perpendicular to the drawing surface) in the propagation direction of the light from the lamp 1). A fourth cylinder array 43d includes lens arrays corresponding to the individual lenses of the third cylinder array 43c. A color filter 50 returns a color in a specific wavelength region to the lamp in order to adjust the color coordinate to a given value. The apparatus also includes a condenser lens 48, and a rear compressor 49 including a cylindrical lens having a refractive power in the vertical direction. The illumination optical system α is configured as described above.

A dichroic mirror 58 reflects light in the wavelength regions of blue (B) and red (R), and transmits light in the wavelength region of green (G). A G incidence-side light polarization plate 59 is obtained by adhering a light polarization element on a transparent substrate, and transmits only P-polarized light. A first polarization beam splitter 60 transmits P-polarized light, reflects S-polarized light, and has a polarization splitting surface. A red reflection type liquid crystal displaying element 61R, green reflection type liquid crystal displaying element 61G, and blue reflection type liquid crystal displaying element 61B are displaying elements which reflect incident light and perform image modulation.

The apparatus further includes a red quarter wavelength plate 62R, green quarter wavelength plate 62G, and blue quarter wavelength plate 62B. A trimming filter 64a returns orange light to the lamp in order to increase the color purity of R. An RB incidence-side light polarization plate 64b is obtained by adhering a light polarization element on a transparent substrate, and transmits only P-polarized light. A color selective phase difference plate 65 converts the polarization direction of R light through 900, and does not convert the polarization direction of B light. A second polarization beam splitter 66 transmits P-polarized light, reflects S-polarized light, and has a polarization splitting surface.

A B exit-side light polarization plate (light polarization element) 68B rectifies only S-polarized light of B. A G exit-side light polarization plate 68G transmits only S-polarized light. A dichroic prism 69 transmits R light and B light, and reflects G light.

The above-described components from the dichroic mirror 58 to the dichroic prism 69 form the color decomposing/synthesizing optical system β.

The definitions of P-polarized light and S-polarized light are as follows. The polarization conversion element 45 converts P-polarized light into S-polarized light, and the P-polarized light and S-polarized light herein mentioned are described based on the polarization conversion element 45. On the other hand, light entering the dichroic mirror 58 is considered based on the polarization beam splitters 60 and 66. For convenience, therefore, it is assumed that P-polarized light enters. The light output from the polarization conversion element 45 is S-polarized light, but no problem arises even when the same S-polarized light is defined as P-polarized light as light entering the dichroic mirror 58. Accordingly, the P-polarized light and S-polarized light are so defined in this embodiment.

(Optical Operation)

An optical operation will now be explained. Light emitted from the light-emitting tube 41 is converged in a predetermined direction by the reflector 42. The reflector 42 has a paraboloidal shape, and light from the focal position of the paraboloid becomes a light beam parallel to the axis of symmetry of the paraboloid. Since, however, the light-emitting tube 41 is not an ideal point light source but has a finite size, the converged light beam contains many light components not parallel to the axis of symmetry of the paraboloid.

The light beam enters the first cylinder array 43a. The light beam having entered the first cylinder array 43a is divided into a plurality of light beams corresponding to the individual cylinder lenses, and converged (into a plurality of band-like light beams in the vertical direction). In addition, a plurality of light beams (a plurality of band-like light beams in the vertical direction) are formed near the polarization conversion element 45 via the ultraviolet absorption filter 44 and through the second cylinder array 43b.

The polarization conversion element 45 includes the polarization splitting surface, reflecting surface, and half wavelength plate. The plurality of light beams enter the polarization splitting surface corresponding to the column, and are divided into transmitted light having a P-polarized light component and reflected light having an S-polarized light component. The reflected light having the S-polarized light component is reflected by the reflecting surface, and output in the same direction as that of the P-polarized light component. On the other hand, the transmitted light having the P-polarized light component is converted into the same polarized light component as the S-polarized light component when transmitted through the half wavelength plate, and output as light having the same polarization direction.

A plurality of polarization-converted light beams (a plurality of band-like light beams in the vertical direction) output from the polarization conversion element 45 are reflected through 88° by the reflection mirror 47 via the front compressor 46. After that, the light beams enter the third cylinder array 43c. The light beams having entered the third cylinder array 43c are divided into a plurality of light beams corresponding to the individual cylinder lenses, and converged (into a plurality of band-like light beams in the horizontal direction). Then, the light beams become a plurality of light beams (a plurality of band-like light beams in the horizontal direction) through the fourth cylinder array 43d, and reach the condenser lens 48 and rear compressor 49.

The plurality of light beams form a rectangular uniform illumination area in which rectangular images overlap each other due to the optical operation relationship between the front compressor 46, condenser lens 48, and rear compressor 49. The reflection type liquid crystal displaying elements 61R, 61G, and 61B (to be described later) are arranged in this illumination area. Subsequently, the light converted into S-polarized light by the polarization conversion element 45 enters the dichroic mirror 58. Note that the dichroic mirror 58 reflects light of B (430 to 495 nm) and R (590 to 650 nm), and transmits light of G (505 to 580 nm).

1) Optical Path of G

The optical path of G will be explained below. G light having transmitted the dichroic mirror 58 enters the incidence-side light polarization plate 59. Note that the G light is P-polarized light (S-polarized light when based on the polarization conversion element 45) even after decomposed by the dichroic mirror 58. After being output from the incidence-side light polarization plate 59, the G light enters the first polarization beam splitter 60 as P-polarized light. The G light is transmitted through the polarization splitting surface, and reaches the G reflection type liquid crystal displaying element 61G. In the G reflection type liquid crystal displaying element 61G, the G light is image-modulated and reflected.

The P-polarized light component of the image-modulated G reflected light is transmitted through the polarization splitting surface of the first polarization beam splitter 60 again, returned to the light source side, and removed from the projection light. On the other hand, the S-polarized light component of the image-modulated G reflected light is reflected by the polarization splitting surface of the first polarization beam splitter 60, and propagates as the projection light to the dichroic prism 69.

In a state in which all the polarized light components are converted into P-polarized light (a state in which black is displayed), the lagging-phase axis of the quarter wavelength plate 62G disposed between the first polarization beam splitter 60 and G reflection type liquid crystal displaying element 61G is adjusted in a predetermined direction. This makes it possible to decrease the influence of the disturbance of a polarized state, which occurs in the first polarization beam splitter 60 and G reflection type liquid crystal displaying element 61G.

The G light output from the first polarization beam splitter 60 enters the third polarization beam splitter 69 as S-polarized light. The G light is then reflected by the dichroic membrane surface of the dichroic prism 69, and reaches a projection lens 70.

2) Optical Paths of R and B

On the other hand, the R light and B light reflected by the dichroic mirror 58 enter the incidence-side light polarization plate 64a. Note that the R light and B light are P-polarized light even after decomposed by the dichroic mirror 58. The trimming filter 64a cuts orange light from the R light and B light. After that, the R light and B light are output from the incidence-side light polarization plate 64b, and enter the color selective phase difference plate 65. The color selective phase difference plate 65 has a function of rotating the polarization direction of only the R light through 90°. Accordingly, the R light and B light enter the second polarization beam splitter 66 as S-polarized light and P-polarized light, respectively.

The R light having entered the second polarization beam splitter 66 as S-polarized light is reflected by the polarization splitting surface of the second polarization beam splitter 66, and reaches the R reflection type liquid crystal displaying element 61R. The B light having entered the second polarization beam splitter 66 as P-polarized light is transmitted through the polarization splitting surface of the second polarization beam splitter 66, and reaches the B reflection type liquid crystal displaying element 61B.

The R light having entered the R reflection type liquid crystal displaying element 61R is image-modulated and reflected. The S-polarized light component of the image-modulated R reflected light is reflected by the polarization splitting surface of the second polarization beam splitter 66 again, returned to the light source side, and removed from the projection light. On the other hand, the P-polarized light component of the image-modulated R reflected light is transmitted through the polarization splitting surface of the second polarization beam splitter 66, and propagates as the projection light to the dichroic prism 69.

Also, the B light having entered the B reflection type liquid crystal displaying element 61B is image-modulated and reflected. Of the P-polarized light component of the image-modulated B reflected light is transmitted through the polarization splitting surface of the second polarization beam splitter 66 again, returned to the light source side, and removed from the projection light. On the other hand, the S-polarized light component of the image-modulated B reflected light is reflected by the polarization splitting surface of the second polarization beam splitter 66, and propagates as the projection light to the dichroic prism 69.

In this state, the black display of R and B can be adjusted in the same manner as that for G by adjusting the lagging-phase axes of the quarter wavelength plates 62R and 62B disposed between the second polarization beam splitter 66 and the R and B reflection type liquid crystal displaying elements 61R and 61B.

Of the projection light of R and B synthesized into one light beam and output from the second polarization beam splitter 66, the B light is detected by the exit-side light polarization plate 68B, and enters the dichroic prism 69. Also, the R light is transmitted as P-polarized light through the light polarization plate 68B, and enters the dichroic prism 69.

Note that when detected by the exit-side light polarization plate 68B, the B projection light becomes light from which disabled components generated when the light passes through the second polarization beam splitter 66, B reflection type liquid crystal displaying element 61B, and quarter wavelength plate 62B are cut. The R projection light and B projection light having entered the dichroic prism 69 are transmitted through the dichroic membrane surface of the dichroic prism 69, and synthesized with the G light reflected by the dichroic membrane surface. The synthesized light reaches the projection lens 5. The projection lens 5 projects the synthesized RGB projection light onto a projection target surface such as a screen in an enlarged scale.

The optical paths when the reflection type liquid crystal displaying element performs white display have been explained above. Optical paths when the reflection type liquid crystal displaying element performs black display will be explained below.

(Black Display)

1) G Optical Path in Black Display

First, the optical path of G will be explained. The P-polarized light of the G light transmitted through the dichroic mirror 58 enters the incidence-side light polarization plate 59. After that, the G light enters the first polarization beam splitter 60, and is transmitted through the polarization splitting surface. The transmitted G light reaches the G reflection type liquid crystal displaying element 61G. Since, however, the reflection type liquid crystal displaying element 61G performs black display, the G light is reflected without being image-modulated. Accordingly, the G light is still P-polarized light even after reflected by the reflection type liquid crystal displaying element 61G. Therefore, the G light is transmitted through the polarization splitting surface of the first polarization beam splitter 60 again, transmitted through the incidence-side light polarization plate 59, returned to the light source side, and removed from the projection light.

2) Optical Paths of R and B in Black Display

The optical paths of R and B will now be explained. The R light and B light as P-polarized light reflected by the dichroic mirror 58 enter the incidence-side light polarization plate 64b. The R light and B light are output from the incidence-side light polarization plate 64b, and enter the color selective phase difference plate 65. The color selective phase difference plate 65 has a function of rotating the polarization direction of only R light through 90°. Therefore, the R light and B light enter the second polarization beam splitter 66 as S-polarized light and P-polarized light, respectively.

The R light having entered the second polarization beam splitter 66 as S-polarized light is reflected by the polarization splitting surface of the second polarization beam splitter 66, and reaches the R reflection type liquid crystal displaying element 61R. The B light having entered the second polarization beam splitter 66 as P-polarized light is transmitted through the polarization splitting surface of the second polarization beam splitter 66, and reaches the B reflection type liquid crystal displaying element 61B. Since the R reflection type liquid crystal displaying element 61R performs black display, the R light having entered the R reflection type liquid crystal displaying element 61R is reflected without being image-modulated.

Accordingly, the R light is still S-polarized light even after reflected by the R reflection type liquid crystal displaying element 61R. Therefore, the R light is reflected by the polarization splitting surface of the first polarization beam splitter 60 again, returned to the light source side through the incidence-side light polarization plate 64b, and removed from the projection light. Consequently, black display is performed. On the other hand, the B light having entered the B reflection type liquid crystal displaying element 61B is reflected without being image-modulated, because the B reflection type liquid crystal displaying element 61B performs black display.

Accordingly, the B light is still P-polarized light even after reflected by the B reflection type liquid crystal displaying element 61B, and hence is transmitted through the polarization splitting surface of the first polarization beam splitter 60 again. The color selective phase difference plate 65 converts the B light into P-polarized light. The P-polarized light is transmitted through the incidence-side light polarization plate 64b, returned to the light source side, and removed from the projection light.

The foregoing is the optical arrangement of the projection type image displaying apparatus using the reflection type liquid crystal displaying element (reflection type liquid crystal panel).

(Displaying Apparatus Unit as Dustproof Target)

Figure 4:
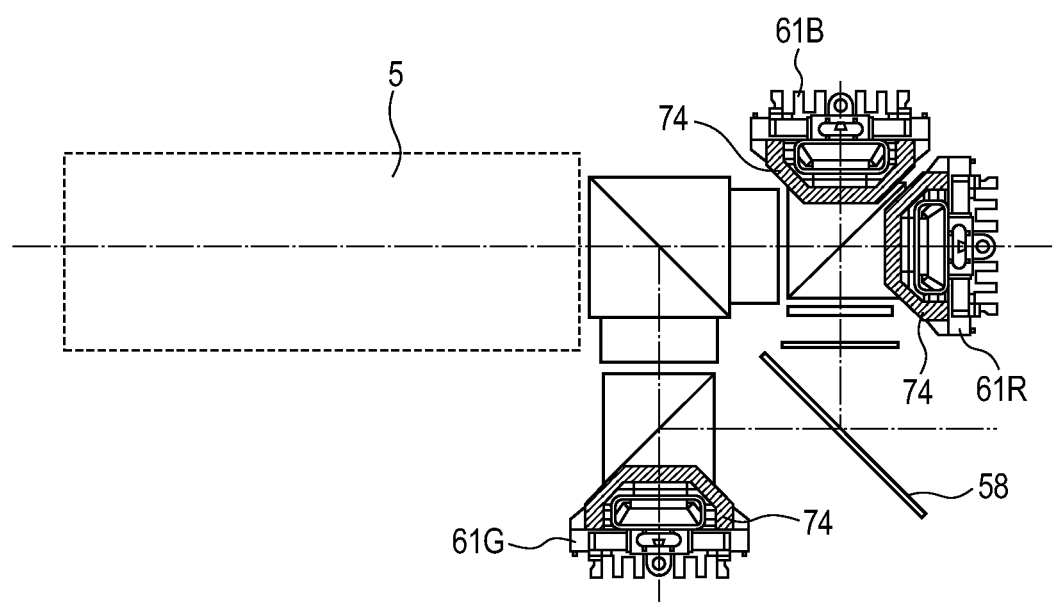
FIG. 4 is a side view showing the first embodiment.

Next, a displaying apparatus unit as a dustproof target according to this embodiment will be described below. FIG. 4 is a side view showing details of the system β shown in FIGS. 2A and 2B. The reflection type liquid crystal displaying elements 61G, 61B, and 61R are unitized with a dustproof structure being attached, with respect to the prism 60 as a prism member, and fixed by adhesion via panel holding plates 74. When fixed by adhesion, the reflection type liquid crystal displaying elements 61G, 61B, and 61R are fixed after their positions are adjusted in six-axis directions, so that they confront the optical image plane of the projection lens 5.

Figure 5A:
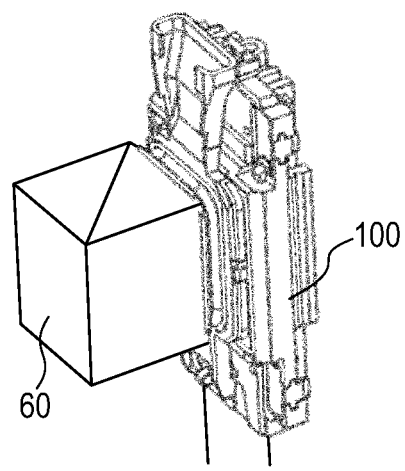
FIG. 5A is a perspective view showing the first embodiment.
Figure 5B:
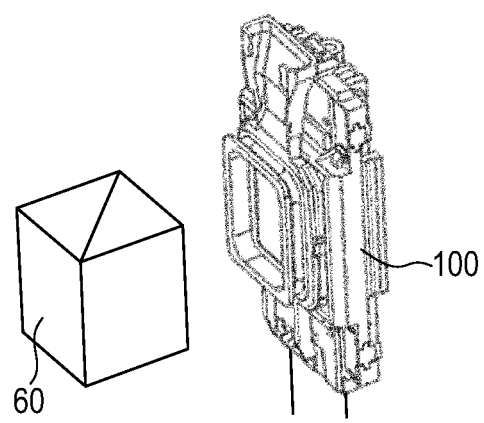
FIG. 5B is a perspective view showing the first embodiment.
Figure 5C:
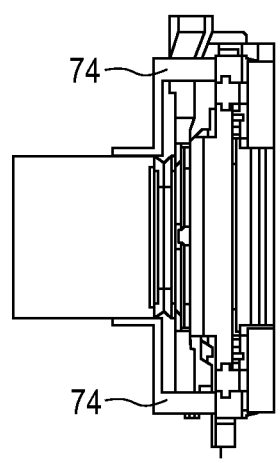
FIG. 5C is a side view showing the first embodiment.

FIGS. 5A, 5B, and 5C are more detailed perspective views. A state shown in FIG. 5B is a state before a reflection type liquid crystal element unit 100 is adjusted with respect to the prism 60. A state shown in FIG. 5A is a state after adjustment and fixation (the panel holding plates 74 for fixing a reflection type liquid crystal panel unit 101 with respect to the prism 60 are not shown).

That is, in the state shown in FIG. 5B, the positional relationship between the panel unit 100 and prism 60 is adjusted in six-axis positions with respect to the image plane of the projection lens 5, and the panel unit 100 is fixed as shown in FIG. 5A. In this structure using the three reflection type liquid crystal panels for R, G, and B, the positioning accuracy requires adjustment accuracy in units of µm. In the state shown in FIG. 5A, a dustproof structure is sufficiently formed between the liquid crystal panel and prism, and the entrance of dust from the outside is prevented.

(Dustproof Cover Member)

Figure 1:
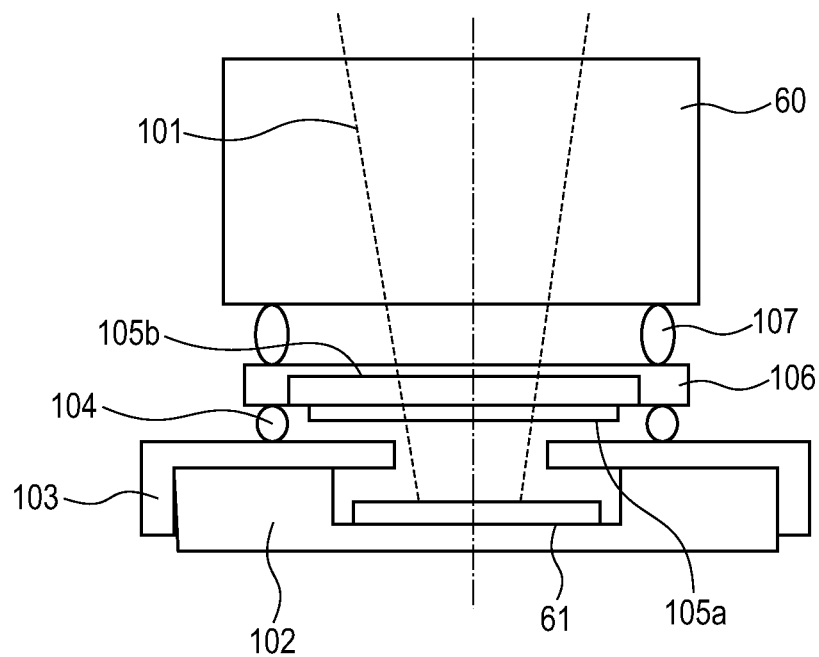
FIG. 1 is a schematic sectional view showing the first embodiment of the present invention.

A practical dustproof structure using a dustproof cover member will be explained below with reference to FIG. 1. FIG. 1 is a sectional view simplified as a structure in the optical path direction in FIG. 5A. Referring to FIG. 1, a reflection type liquid crystal element 61 is fixed to a panel holder 102.

1) First Dustproof Cover

A first dustproof cover 103 is attached as a dustproof cover member to the panel holder 102. The first dustproof cover 103 has a structure covering a part of the panel holder 102, and a portion of the liquid crystal element 61 except for a displaying region.

The opening region of the first dustproof cover 103 is set to be smaller than the outer shape region of the reflection type liquid crystal element 61, and larger than the displaying region of the reflection type liquid crystal element 61. Also, the first dustproof cover 103 has a structure covering the side surfaces of the reflection type liquid crystal element 61 as well. This structure prevents easy adhesion of dust.

In this embodiment, the first dustproof cover 103 can be either an elastic body or rigid body. When using the elastic body, it is possible to use, e.g., rubber or polyester elastomer, such as an urethane elastomer, a styrene elastomer, an orefin elastomer, an amide elastomer, as a resin close to rubber.

2) Second Dustproof Cover

In addition, a second dustproof cover member 104 has a dustproof structure covering a space between a wavelength plate holder 106 and the first dustproof member 103 (more specifically, the second dustproof cover member 104 forms dustproof walls on the four sides (of a rectangle)). That is, the second dustproof cover 104 has one end attached to the wavelength plate holder 106, and the other end brought into tight contact with the first dustproof cover.

The wavelength plate holder 106 holds a transparent glass substrate 105b such as a white plate in a contact state. A quarter wavelength plate film 105a is adhered on a surface of the transparent glass substrate 105b, which opposes the reflection type liquid crystal element 61.

In this embodiment, the second dustproof cover 104 can be either an elastic body or rigid body. When using the elastic body, it is possible to use, e.g., rubber or polyester elastomer, such as an urethane elastomer, a styrene elastomer, an orefin elastomer, an amide elastomer, as a resin close to rubber.

3) Third Dustproof Cover

Furthermore, a third dustproof cover 107 has a dustproof structure covering a space between the wavelength plate holder 106 and prism 60. That is, the third dustproof cover 107 has one end attached to the wavelength plate holder 106, and the other end brought into tight contact with the prism 60.

In this embodiment, the third dustproof cover 107 can be either an elastic body or rigid body. When using the elastic body, it is possible to use, e.g., rubber or polyester elastomer, such as an urethane elastomer, a styrene elastomer, an orefin elastomer, an amide elastomer, as a resin close to rubber.

4) Hardness of Dustproof Cover

The first dustproof cover 103 is closest to the reflection type liquid crystal element 61, and the adhesion of finer dust particles to the reflection type liquid crystal element 61 poses a problem. Therefore, a reliable dustproof structure has to be adopted. In addition, the panel holder 102 has a complicated outer shape, so the first dustproof cover 103 also has a complicated shape. This readily produces a thickness difference in a component, and the deformation of the component readily forms a gap. The first dustproof cover 103 has to have a reliable dustproof structure from this point as well. In this embodiment, the first dustproof cover 103 is formed by a hard material.

This makes it possible to suppress the deformation of even a thin portion of the first dustproof cover 103, so the dustproof effect does not fade due to the formation of a gap by deformation.

On the other hand, the second dustproof cover 104 has one end attached to the wavelength plate holder 106, and the other end brought into tight contact with the first dustproof cover. Since the second dustproof cover 104 is connected to the two components, dimensional tolerance variations have to be absorbed. If a hard material such as the first dustproof cover is used, therefore, the wavelength plate holder 106 deforms, and a stress caused by this deformation is transferred to the transparent glass substrate 105b and quarter wavelength plate film 105a. Consequently, birefringence occurs due to the photoelastic effect, and this may cause a luminance unevenness of black on the screen.

Accordingly, the hardness of the second dustproof cover 104 has to be made different from that of the first dustproof cover 103, and it is preferable to use a material having a low hardness. Also, as described previously, a gap is readily formed by deformation if a complicated shape or a portion having a large thickness difference is formed by a low-hardness material. Therefore, the portion of the second dustproof cover 104, which is brought into contact with the first dustproof cover, desirably has a simple sectional shape (e.g., a square or circle), and a small thickness difference.

Furthermore, the third dustproof cover 107 has to have a hardness lower than those of the first dustproof cover 103 and second dustproof cover 104 for the following reasons.

First, the charge amount of the third dustproof cover 107 with respect to the prism 60 largely varies due to the accuracy of mounting of the projection lens 5 to a projection lens mount, the adhesion accuracy of the prism 60, and the component tolerance variation. If this charge amount variation increases a counterforce when performing six-axis adjustment on the whole structure including the liquid crystal panel with respect to the prism 60, the six-axis adjustment loses linearity and gets hysteresis, and this makes the six-axis adjustment difficult. Also, if the counterforce keeps acting after the adjustment and adhesion, the position of the overall structure including the liquid crystal panel may fluctuate with time.

If the hardness of the third dustproof cover 107 is decreased, dust may enter due to deformation as described above. However, the transparent substrate surface and prism surface covered with the third dustproof cover 107 are positioned farther from the focal plane of the liquid crystal panel, so adhered dust is defocused and projected with low luminance on the displaying screen. That is, properly managing a gap to be formed makes it possible to regulate the size of a dust particle which falls outside the allowable range and may adhere. Even if a dust particle having a size falling within the allowable range adheres, this dust particle can be made visually unrecognizable.

In the above-described embodiment, different materials are used to obtain different hardnesses. However, it is also possible to use different section moduli (different areas in a sectional shape or different lengths in a predetermined direction) of the same material.

(Displaying Apparatus Unit Manufacturing Method (Assembling Method))

In this embodiment, a displaying apparatus unit manufacturing method (assembling method) has the following steps (procedures) in order.

1) The panel holder 102 to which the reflection type liquid crystal element 61 is fixed (by, e.g., a double sided tape, an adhesion bond) is fitted in the first dustproof cover 103 and integrated with it.

2) The second dustproof cover 104 is placed on the first dustproof cover 103.

3) The wavelength plate holder 106 to which the quarter wavelength plate film 105a is fixed (by, e.g., a double sided tape, an adhesion bond) with the transparent glass substrate 105b being interposed between them is fitted in the third dustproof cover 107 and integrated with it.

4) The first, second, and third dustproof covers 103, 104, and 107 are arranged in order in the direction of spacings (in this embodiment, they are stacked in contact with each other), and brought into tight contact with each other between the prism 60 and first dustproof cover 103.

5) The light amount is adjusted by rotating the reflection type liquid crystal element 61 relative to the quarter wavelength plate film 105a.

6) Six-axis adjustment is performed on the whole structure including the reflection type liquid crystal element 61 and quarter wavelength plate film 105a with respect to the prism 60.

7) The light amount is finely adjusted by finely rotating the reflection type liquid crystal element 61 relative to the quarter wavelength plate film 105a.

Second Embodiment

The second embodiment in which a further effective function is added based on the basic dustproof structure disclosed in the first embodiment will be explained below. This embodiment includes an elastically deformable claw portion 110a as a structure for bringing a first dustproof cover 110 into tight contact with a panel holder 102 more reliably. An explanation of the same members and functions as those of the first embodiment will be omitted.

Figure 6A:
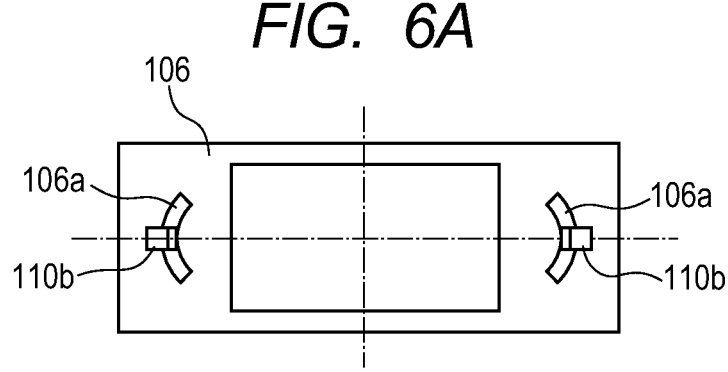
FIG. 6A is a plan view showing the second embodiment of the present invention.
Figure 6B:
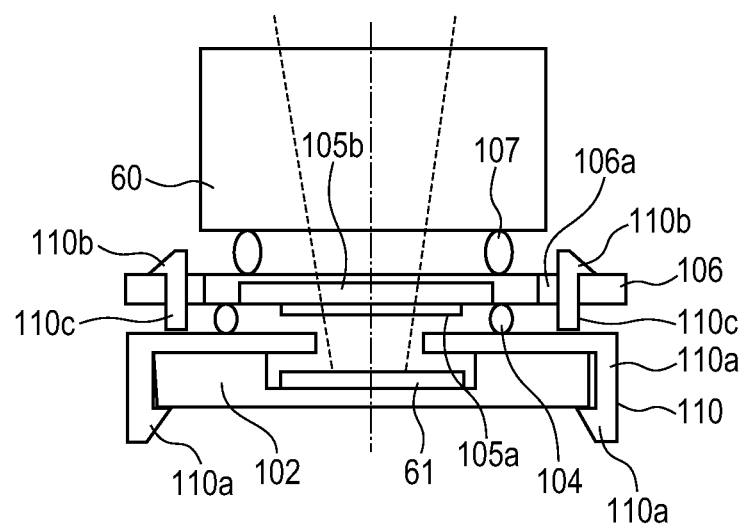
FIG. 6B is a sectional view showing the second embodiment of the present invention.

FIGS. 6A and 6B are respectively a plan view and sectional view of this embodiment. The claw portion 110a has a taper on the insertion portion side of the first dustproof cover 110. When the first dustproof cover 110 as an elastic body is inserted into the panel holder 102 as a rigid body, the claw portion 110a automatically opens. When the panel holder 102 is inserted to the root of the claw portion 110a, the panel holder 102 is hooked and brought into tight contact because the thickness of the first dustproof cover 110 is set to be slightly smaller than that of the panel holder 102.

Figure 6C:
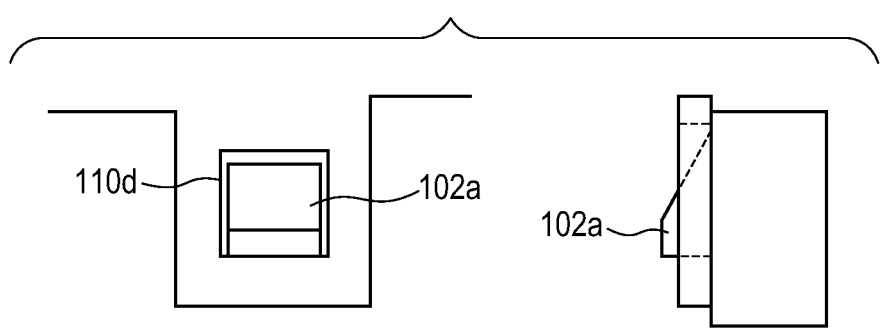
FIG. 6C is an enlarged view showing a modification of the second embodiment of the present invention.

Note that as a modification, as shown in FIG. 6C, a slope 102b is formed on the panel holder 102, and a square window 110d is formed in the first dustproof cover 110. This structure can also achieve the same effect as above.

In this embodiment, as shown in FIG. 6B, the first dustproof cover 110 has a claw portion 110b having a sloped distal end as a wavelength plate holder fixing unit. A wavelength plate holder 106 has a circular elongated hole 106a into which the claw portion 110b is to be inserted (FIG. 6A). A quarter wavelength plate film 105a can rotate around the normal line of a reflection type liquid crystal element 61. The light amount can be adjusted by rotating the quarter wavelength plate film 105a relative to the reflection type liquid crystal element 61.

Note that the distance to the root of the slope of the wavelength plate holder fixing portion 110b is set to be slightly smaller than a numerical value obtained by adding the thicknesses of a wavelength plate holder and second dustproof cover 104. Accordingly, when the wavelength plate holder 106 is inserted into the first dustproof cover 110 with the second dustproof cover 104 being sandwiched between them, the slope of the claw portion 110b is inserted into the elongated hole 106a. When the slope projects from the elongated hole 106a, the dustproof cover 104 is brought into tight contact with the wavelength plate holder 106 and first dustproof cover 110.

When the second dustproof cover 104 and wavelength plate holder 106 are thus attached to the first dustproof cover 110, rotational adjustment can be performed on the wavelength plate holder 106 with respect to the first dustproof cover 110, because the circular elongated hole 106a is formed in the wavelength plate holder 106. The contrast of a projection type displaying apparatus can be adjusted by performing rotational adjustment on the wavelength plate holder 106.

(Displaying Apparatus Unit Manufacturing Method (Assembling Method))

In this embodiment shown in FIG. 6B, a displaying apparatus unit manufacturing method (assembling method) has the following steps (procedures) in order. Note that the reference numerals of the same members as those shown in FIG. 1 (the first embodiment) are omitted.

1) The panel holder 102 to which the reflection type liquid crystal element 61 is fixed (by, e.g., a double sided tape, an adhesion bond) is fitted in the first dustproof cover 110 and integrated with it.

2) The second dustproof cover 104 is placed on the first dustproof cover 110.

3) The wavelength plate holder 106 as a rigid body to which the quarter wavelength plate film 105*a* is fixed (by, e.g., a double sided tape, an adhesion bond) with the transparent glass substrate 105*b* being interposed between them is placed on the second dustproof cover 104. More specifically, the wavelength plate holder 106 is placed on the second dustproof cover 104 through the opening 106*a* by using the elasticity of the inclined portion 110*b* of the first dustproof cover 110 as an elastic body.

4) A third dustproof cover 107 is fixed (by, e.g., a double sided tape, an adhesion bond) to the side of the wavelength plate holder 106, which is opposite to the second dustproof cover 104.

5) The first, second, and third dustproof covers 110, 104, and 107 are arranged in order in the direction of spacings (in this embodiment, they are stacked in contact with each other), and brought into tight contact with each other between a prism 60 and the first dustproof cover 103.

6) The light amount is adjusted by rotating the reflection type liquid crystal element 61 relative to the quarter wavelength plate film 105*a*.

7) Six-axis adjustment is performed on the whole structure including the reflection type liquid crystal element 61 and quarter wavelength plate film 105*a* with respect to the prism 60.

8) The light amount is finely adjusted by finely rotating the reflection type liquid crystal element 61 relative to the quarter wavelength plate film 105*a*.

Third Embodiment

This embodiment is obtained by further improving the second embodiment. An explanation of the same members and functions as those of the second embodiment will be omitted. In this embodiment shown in FIG. 7A, the hardness of second and third dustproof covers 104 and 107 is set to be lower than that of a first dustproof cover 110, so the following structure can further be added. That is, fixing ribs 106*b* and 106*c* are circularly disposed on a wavelength plate holder 106. In addition, grooves 104*a* are formed in attaching portions of the second dustproof cover 104, and grooves 107*a* are formed in attaching portions of the third dustproof cover 107.

When attaching the second and third dustproof covers 104 and 107 to the wavelength plate holder 106, the dustproof covers 104 and 107 are extended in the radial direction, and the fixing ribs are inserted into the grooves. Consequently, the wavelength plate holder 106 holds the dustproof covers 104 and 107 by the force in the radial direction.

Note that the same effect can be obtained by integrating the second and third dustproof covers 104 and 107 by, e.g., thermally crimping them, and giving one of them an attaching shape having the above-mentioned, groove-rib relationship.

Figure 8A:
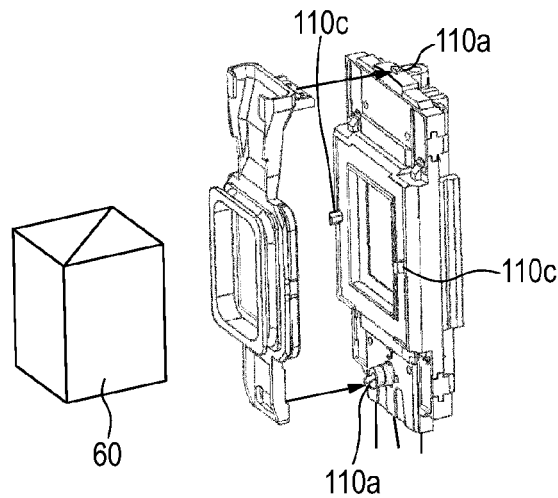
FIG. 8A is an exploded perspective view showing the third embodiment.

FIG. 8A is a perspective view showing the arrangement described in this embodiment. The first dustproof cover includes claw portions 110*a* as panel holder holding members. The claw portions 110*a* may also be formed on the side surfaces of the panel holder (the claw portions on the side surfaces are convenient for performing adhesion after adjustment). It is also convenient if a first dustproof cover 110 has projections 110*c* serving as guides which prevent the fluctuation of the rotation center when the wavelength plate holder 106 rotates.

Figure 8B:
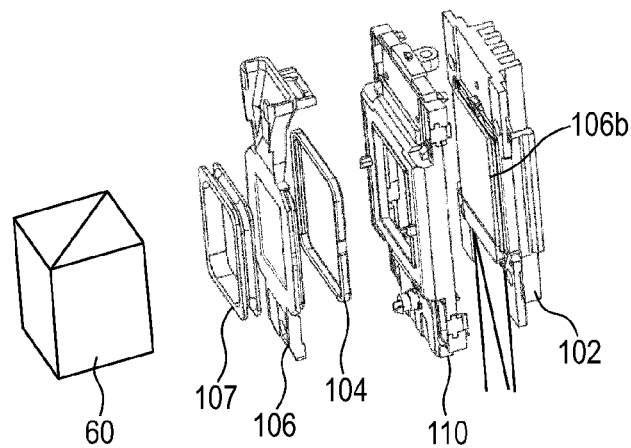
FIG. 8B is an exploded perspective view showing the third embodiment.
Figure 8C:
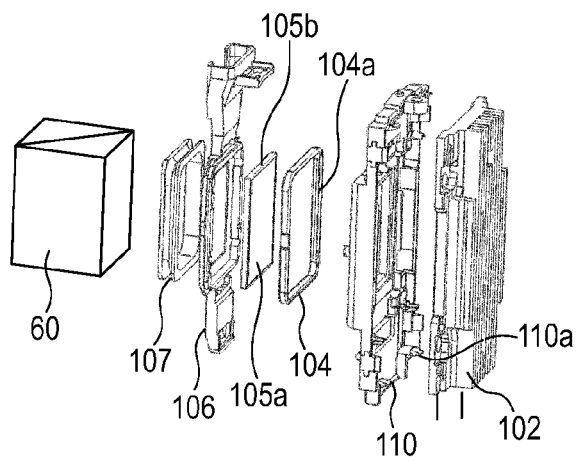
FIG. 8C is an exploded perspective view showing the third embodiment.

FIGS. 8B and 8C are perspective views when the first, second, and third dustproof covers 103, 104, and 107 are detached. The grooves 104*b* are formed in the second dustproof cover 104, and the ribs 106*b* are formed on the wavelength plate holder 106. The grooves and ribs are engaged with each other by extending the second dustproof cover 104 in the radial direction, and held in this state by the elasticity of the second dustproof cover 104.

On the other hand, the third dustproof cover 107 can also have a similar holding structure. As shown in the drawings, the third dustproof cover 107 may also be fixed by adhesion on the surface portion of the wavelength plate holder 106 by using, e.g., a double sided tape, an adhesion bond. In addition, as described previously, no problem arises even when the second and third dustproof covers 104 and 107 are thermally welded, and a structure for holding the wavelength plate holder 106 is formed on the second dustproof cover 104.

(Displaying Apparatus Unit Manufacturing Method (Assembling Method))

Figure 7A:
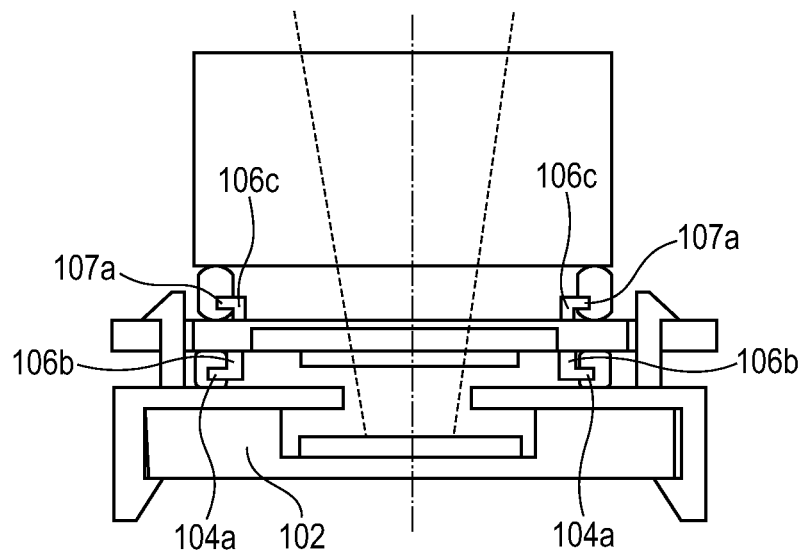
FIG. 7A is a sectional view showing the third embodiment of the present invention.
Figure 7B:
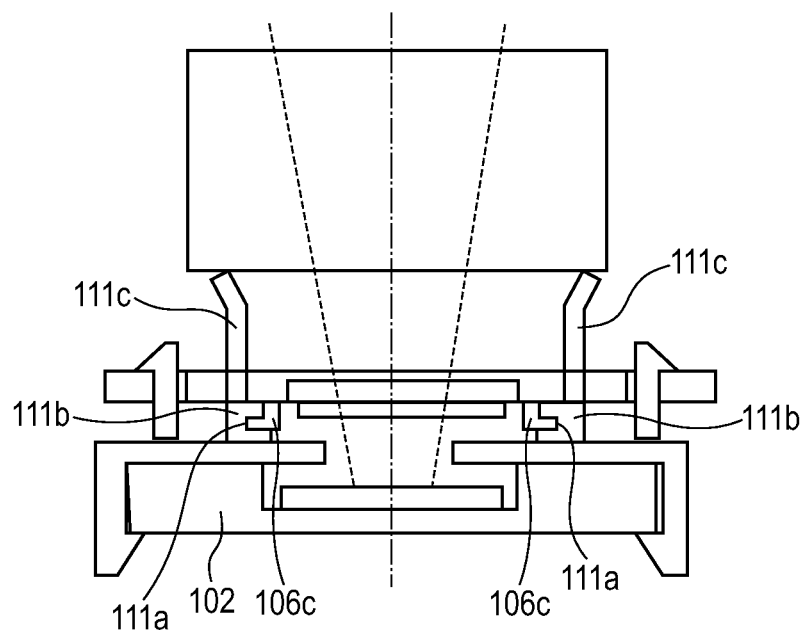
FIG. 7B is a sectional view showing a modification of the third embodiment of the present invention.

In this embodiment shown in FIG. 7A, a displaying apparatus unit manufacturing method (assembling method) has the following steps (procedures) in order. Note that the reference numerals of the same members as those shown in FIG. 1 (the first embodiment) and FIG. 6B (the second embodiment) are omitted.

1) The panel holder 102 to which the reflection type liquid crystal element 61 is fixed (by, e.g., a double sided tape, an adhesion bond) is fitted in the first dustproof cover 110 and integrated with it.

2) The second dustproof cover 104 is placed on the first dustproof cover 110.

3) The wavelength plate holder 106 as a rigid body to which the quarter wavelength plate film 105*a* is fixed (by, e.g., a double sided tape, an adhesion bond) with the transparent glass substrate 105*b* being interposed between them is placed on the second dustproof cover 104. More specifically, the wavelength plate holder 106 is placed on the second dustproof cover 104 through the opening 106*a* by using the elasticity of the inclined portion 110*b* of the first dustproof cover 110 as an elastic body. In this state, the projections 106*b* of the wavelength plate holder 106 as a rigid body are fitted in the grooves 104*a* of the second dustproof cover 104 as an elastic body.

4) The third dustproof cover 107 is fixed (by, e.g., a double side tape, an adhesion bond) to the side of the wavelength plate holder 106, which is opposite to the second dustproof cover 104.

5) The first, second, and third dustproof covers 110, 104, and 107 are arranged in order in the direction of spacings (in this embodiment, they are stacked in contact with each other), and brought into tight contact with each other between a prism 60 and the first dustproof cover 110.

6) The light amount is adjusted by rotating the reflection type liquid crystal element 61 relative to the quarter wavelength plate film 105*a*.

7) Six-axis adjustment is performed on the whole structure including the reflection type liquid crystal element 61 and quarter wavelength plate film 105*a* with respect to the prism 60.

8) The light amount is finely adjusted by finely rotating the reflection type liquid crystal element 61 relative to the quarter wavelength plate film 105*a*.

(Modifications)

The preferred embodiments of the present invention have been explained above, but the present invention is not limited to these embodiments. For example, the displaying element is not limited to a reflection type liquid crystal element, and may also be a DLP element or transmission type liquid crystal element. In addition, the optical operating plate is not limited to a quarter wavelength plate, and may also be a light polarization plate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073392, filed Mar. 31, 2014, which is hereby incorporated by reference herein in its entirety.

What is claimed is:

1. A displaying apparatus unit comprising:
a first holder configured to hold a displaying element;
a second holder configured to hold an optical operating plate which operates on light from the displaying element;
a prism member disposed on an opposite side of the displaying element with respect to the optical operating plate;
a first dustproof cover member disposed between the first holder and the second holder, and configured to cover a whole side surface of the displaying element;
a second dustproof cover member disposed between the first dustproof cover member and the second holder; and
a third dustproof cover member disposed between the prism member and the second holder,
wherein the first dustproof cover member is in contact with the first holder,
the second dustproof cover member is in contact with the second holder,
the first dustproof cover member and the second dustproof cover member are in contact with each other, and
the first dustproof cover member has a hardness higher than that of the second dustproof cover member.

2. A displaying apparatus unit according to claim 1, wherein the first dustproof cover member and the second dustproof cover member are elastic.

3. A displaying apparatus unit according to claim 1, wherein the displaying element is a reflection type displaying element, and the optical operating plate is a quarter wavelength plate.

4. A displaying apparatus unit according to claim 1, wherein the first dustproof cover member has a hardness higher than that of the third dustproof cover member.

5. A displaying apparatus unit according to claim 1, wherein the second dustproof cover member has a hardness higher than that of the third dustproof cover member.

6. A displaying apparatus unit according to claim 1, wherein at least one of the first dustproof cover member, the second dustproof cover member, and the third dustproof cover member includes an elastically deformable claw portion.

7. A displaying apparatus unit according to claim 1, wherein the second dustproof cover member and the third dustproof cover member are fixed to the second holder, and the first holder is held with respect to the second holder and the prism member such that the first holder can rotate around a normal line of the displaying element.

8. A projection type displaying apparatus comprising:
a displaying apparatus unit; and
a projection optical system configured to project an image of a displaying element onto a screen,
the displaying apparatus unit comprising:
a first holder configured to hold the displaying element;
a second holder configured to hold an optical operating plate which operates on light from the displaying element;
a prism member disposed on an opposite side of the displaying element with respect to the optical operating plate;
a first dustproof cover member disposed between the first holder and the second holder, and configured to cover a side surface of the displaying element;
a second dustproof cover member disposed between the first dustproof cover member and the second holder; and
a third dustproof cover member disposed between the prism member and the second holder,
wherein the first dustproof cover member is in contact with the first holder,
the second dustproof cover member is in contact with the second holder,
the first dustproof cover member and the second dustproof cover member are in contact with each other, and
the first dustproof cover member has a hardness higher than that of the second dustproof cover member.

* * * * *